UNITED STATES PATENT OFFICE.

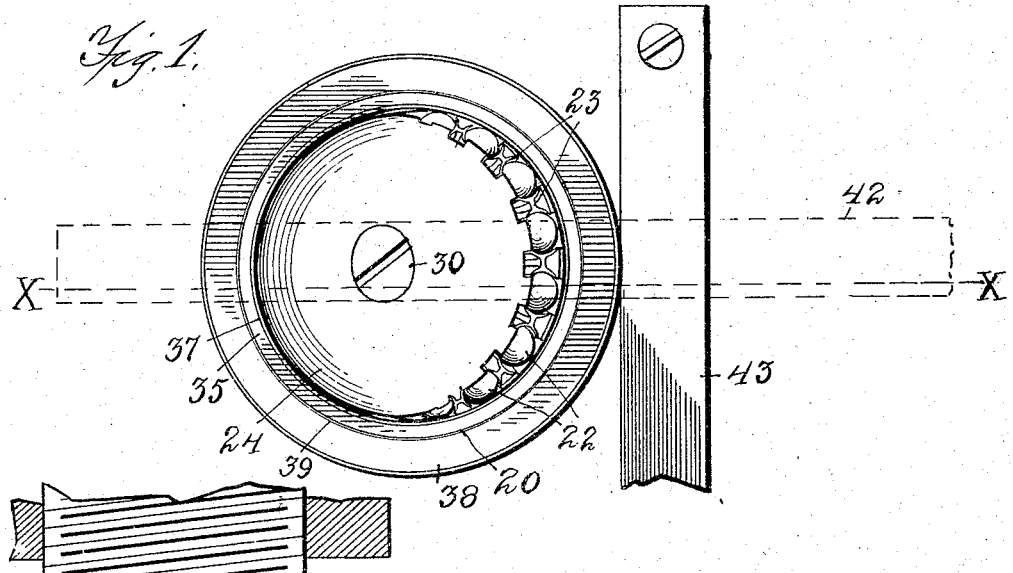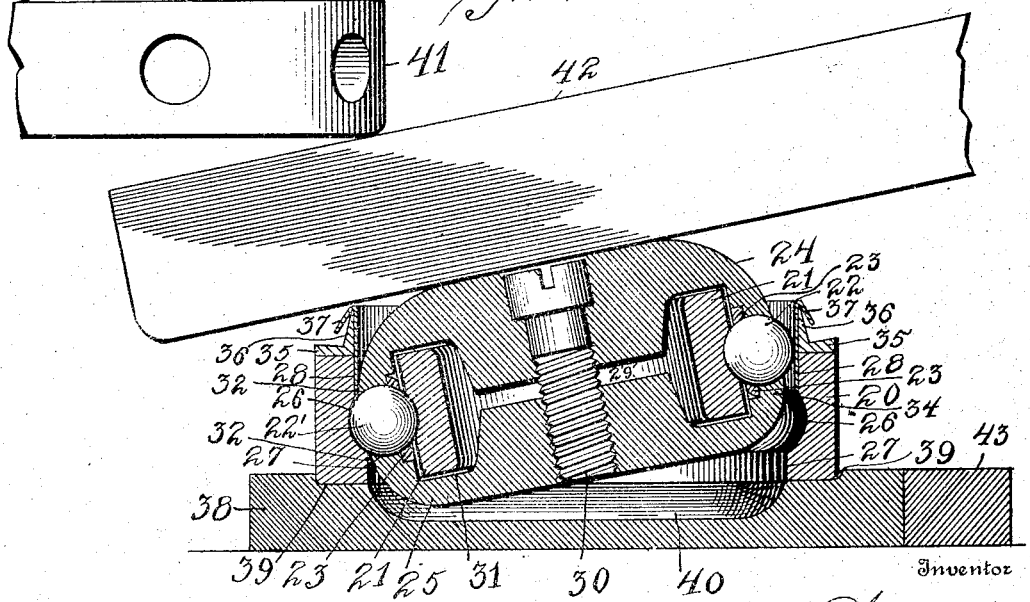

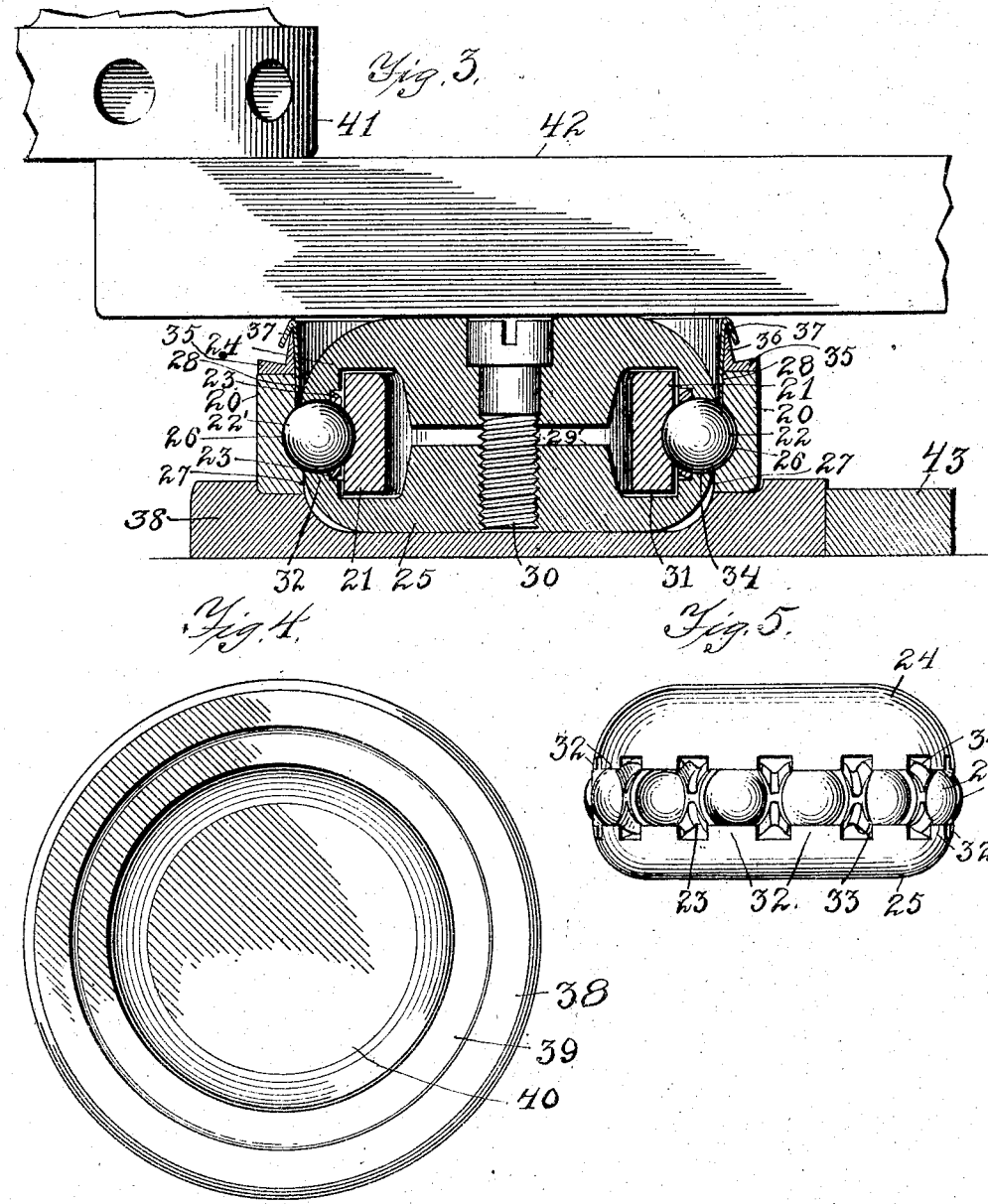

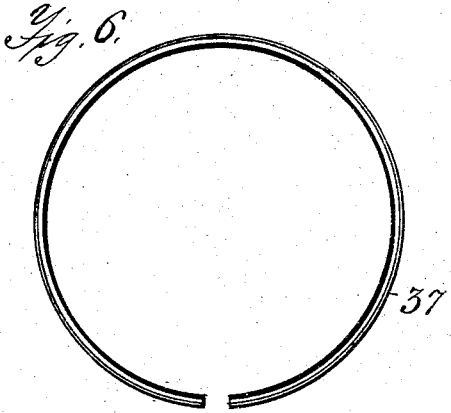
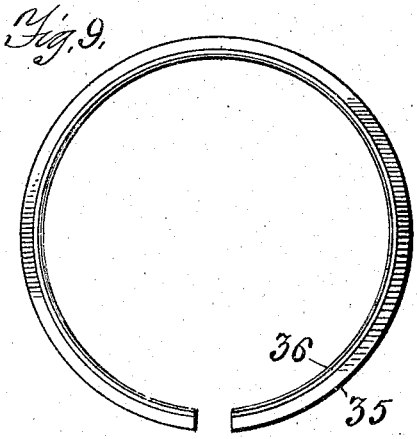
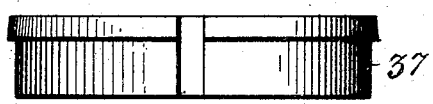
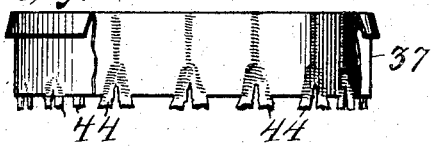
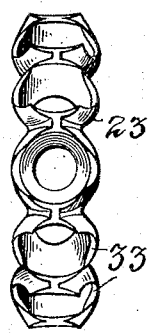
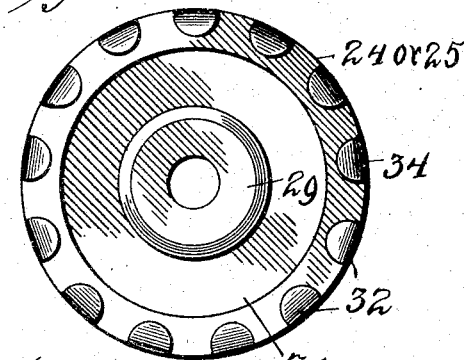
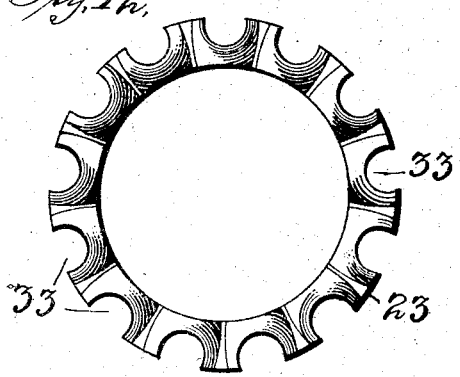

FREDERICK W. GURNEY, OF JAMESTOWN, NEW YORK, ASSIGNOR TO GURNEY BALL BEARING COMPANY, A CORPORATION OF NEW YORK.

METHOD FOR ASSEMBLING BALL-BEARINGS.

1,153,066.  Specification of Letters Patent.   Patented Sept. 7, 1915.

Application filed January 28, 1911, Serial No. 605,199. Renewed August 7, 1915. Serial No. 44,291.

*To all whom it may concern:*

Be it known that I, FREDERICK W. GURNEY, a citizen of the United States, residing at Jamestown, in the county of Chautauqua and State of New York, have invented new and useful Improvements in Methods for Assembling Ball-Bearings, of which the following, taken in connection with the accompanying drawings, is a specification.

The invention relates to methods for assembling ball-bearings; and the improvement consists in providing a novel means and method for entering the balls into unbroken or continuous races or grooves in the race rings without injury to said balls or races.

In the drawings Figure 1 is a plan view of the ball-bearing with clamping plates and levers in position for assembling the same, the upper lever being shown in dotted lines and the ends of both levers broken away; and Fig. 2 is a sectional view of said parts at line X X in Fig. 1 with an adjustable screw, as a fulcrum for the end of the upper lever; and Fig. 3 is a sectional view at line X X in Fig. 1 showing the bearing after it is assembled, the balls having entered the outer race. Fig. 4 is a top plan view of the bed plate for the clamp and rings for assembling the ball-bearing. Fig. 5 is a side elevation of the clamp with an inner ring, spacing ring and balls clamped therein ready for inserting in the outer ring. Fig. 6 is a top plan view and Fig. 7 is a side elevation of the curtain or shield, which protects the balls and race rings in assembling the bearing; and Fig. 8 is an elevation of said protective curtain after use in assembling a bearing, a portion of the curtain being broken away to show the action of the balls on the inner side of the lower edge of said curtain in entering the race. Fig. 9 is a top plan view of the open hanger ring for holding said protective curtain. Fig. 10 is a plan view of the inner side of one of the clamping cups. Fig. 11 is a perspective edgewise view of the spacing ring or separator for the balls showing the outwardly facing cup-shaped openings therein for the balls and the sidewise openings to said cups to receive the projections on the inner faces of the clamping cups; and Fig. 12 is a side elevation of said separator or spacing ring showing the series of said sidewise openings to the ball cups.

Similar numerals refer to corresponding parts in the several views.

The numeral 20 designates the outer race ring and 21 the inner race ring. The numeral 22 designates the balls and 23 designates one form of spacing ring or separator for the balls. A clamp is provided for assembling the inner ring, the spacing ring, and the balls, and for holding said parts firmly in position so that they can not move from their assembled position, which clamp is composed of two clamping plates or cups 24 and 25 and a screw bolt 30. The clamping cup plates 24 and 25 are rounded on their outer surface so as to easily enter the outer race ring, being made sufficiently less in diameter than the inner side of the outer race ring 20 to permit of the balls 22 extending from the periphery of the clamp to engage the groove or race 26 in ring 20. The side 27 of race 26 is preferably made higher in order to provide an ample longitudinal thrust bearing for the balls 22, and the side 28 is made shallower to permit of the insertion of the balls into the race 26.

The inner faces of the clamping cup plates 24 and 25 are preferably formed with the central projections 29 through which the clamping bolt 30 extends with a clearance between them. The clamping bolt 30 has its head inset in the upper cup plate 24 so as to be out of the way of the lever and also that it may be readily released by the application of a screw driver and the cup plate 24 removed. Outside of the inner projections 29 an annular groove 31 is provided to receive the inner ring 21 therein with adjusting space around the same. The inner faces 34 which bear against the outer curve of the ball are curved to fit firmly against said outer curve and hold the balls against the bottom of the race groove in ring 21, not permitting their outward movement. The spaces between the balls on said inner faces 34 of the cup plates are cut away to permit the insertion of the particular ball separator 23 herein shown. The cuts form spaced projections 32 which enter the sidewise openings 33 of the spacing ring 23, thereby holding the balls 22 firmly in place. In case no ball separator was used, or in case of the use of a ball separator of another type, it is obvious that these cuts may be dispensed with, as shown in the modification of the cup plates in Fig. 7, which construction greatly simplifies the cup plates 24 and 25.

A hanger ring 35 is provided which rests upon the upper edge of outer ring 20 in assembling the parts. The hanger ring 35 has an upright portion 36 with a thin upper edge in line with the inner face of the race ring 20. A protective curtain 37 is provided, which is preferably made of soft sheet metal, having a folded upper edge which hangs upon the thin vertical edge 36 of ring 35. The curtain 36 is made of sufficient width to hang down on the inner side of outer ring 20 as far as the upper edge of ball race 26.

A bed or stopping plate 38 is provided having a seat 39 thereon within which ring 20 sets firmly yet fits loosely. Within seat 39 plate 38 is cut away as shown at 40 to provide a stop for the under side of the clamping cup plate 25. The depth of the cutaway portion 40 is important since in assembling the bearing the balls 22 must not strike the lower edge 27 of the race groove 26. Hence the depth of the cutaway portion 40 must not be greater than the projection of said clamping cup plate 25 below the inner ring so that these parts will fit perfectly together and stop the downward movement of the balls 22 when they spring into the groove 26 before the balls 22 strike said lower edge 27.

The bearing is preferably assembled by manual pressure since the fitting of the different parts into place is better accomplished by means of the manual touch and control. Accordingly for the purpose of assembling an adjustable fulcrum 41 is provided, since adjustment is necessary for the height of different bearings. A lever 42 is provided to press the clamp containing the inner race ring 21 and spacer ring 23 and the balls 22 down into the outer race ring, as shown in Figs. 2 and 3, and a second lever 43 is provided by means of which the bed plate 38 and the parts bearing thereon may be held firmly against any outward movement from the lever 42 as it presses slightly forward in pressing down upon the clamped race ring and balls in assembling the bearing.

In the process of assembling, the inner ring 21, spacing ring 23 and balls 22 are clamped firmly within the cup plates 24 and 25 as hereinbefore described. The race ring 20 is heated as hot as permissible without softening or drawing the temper in order to give as much of expansion to said outer race ring as is practicable. The inner race ring 21 with the balls 22 and clamping plates 24 and 25 are kept as cold as possible in order to be in as great a state of contraction as possible.

The hot ring 20 is placed on the bed plate 38 under the fulcrum 41 in the position shown in Fig. 2. The hanger ring 35 is placed on its upper edge with the curtain 37 thereon and extending down to the upper edge of groove 26; the assembled clamp cups 24 and 25 with ring 21 and balls 22 and spacing ring 23 therebetween and the balls 22 extending out therefrom are then quickly placed in the hot ring 20 in the position shown in Figs. 1 and 2. The balls 22 on the side toward the fulcrum 41 being thrust down into the bottom of the groove 26 of ring 20. The lever 43 is placed against the front edge of the bed plate 38 to hold the same firmly against forward movement and the end of lever 42 is then placed under the fulcrum 41 and the lever is pressed downward upon clamping plate 24 thereby forcing the projecting balls 22 progressively down inside the curtain 37 into the groove 26 pivoting on the ball or balls 22' as they move downward and progressing toward the front side, the ring 20 springing and stretching to accommodate the forced entrance of the balls into groove 26.

The curtain 37 protects the balls 22 and the inner face of ring 20 from damage, the soft metal of the curtain 37 being scored or scarred, as shown at 44 in Fig. 7, and forming a sort of cushion or yielding seat for the balls as they enter the groove 26 of the hot race ring 20. The balls are pressed partly through the curtain but are kept from injurious contact with the hardened race ring by said curtain, the soft metal of the curtain acting as a lubricant as it were for the hardened faces of the balls and race ring. The hot outer ring stretches somewhat in the operation. Accordingly a steel of high elasticity is desirable for outer ring 20 on this account.

As hereinbefore stated the cutaway portion 40 of bed plate 38 permits of the balls 22 entering the groove 26 but stops said balls in their downward movement before they strike the lower edge 27 of the race 26 and thereby injure said race and the balls from these hardened substances coming in contact under such heavy pressure. It is apparent that as the balls spring into the groove, the bottom of the clamp cup 25 strikes against bed plate 38 within the cutaway portion 40 and thereby stops said downward movement.

As hereinbefore stated, there is a clearance between the inner ring 21 and the clamping plates 24 and 25 within the groove 31, as shown in Fig. 2, with the balls clamped in the race groove in said ring 21, thereby holding said ring 21 in suspended relation to the clamping plates 24 and 25, thus the side pressure in assembling is exerted entirely upon the balls. The set of balls are thus free to assume a position of greatest contraction by always seeking the bottom of the race groove, for the inner race ring is free to adjust itself to the line of pressure on the balls. The side pressure is applied only to the balls and not to the ring in order that the balls may not be displaced from the bottom of the race groove in the inner ring and so increase the combined diameter of balls and inner ring.

It is apparent that the separator or spacing ring 23 with its outwardly facing ball cups forms an ideal separator for the balls and is applicable only to a ball-bearing assembled after this manner.

I claim as new:

1. A method of assembling a ball bearing having an outer race ring and an inner race ring and balls therebetween in race grooves, one of said race grooves being of less depth on one side than on the other, which consists in holding the balls in one race groove and assembling into the race groove of the other ring by way of the side thereof having less depth.

2. A method of assembling a ball bearing having an outer race ring and an inner race ring with balls therebetween in race grooves, which consists in holding said balls in the race groove in one of said rings and bringing said assembly of ring and balls into the assembled position with the other race ring from one side.

3. A method of assembling a ball bearing having an outer race ring and an inner race ring with balls therebetween in race grooves in said rings, which consists in holding a full complement of said balls in the race groove of one of said rings and inserting the assembly of balls and said ring into the race groove of the other ring from one side and bringing said balls and ring into the assembled position by sidewise pressure on said assembly of balls and ring from said one side.

4. A method of assembling a ball bearing having an outer race ring and an inner race ring with balls therebetween in race grooves, which consists in holding said balls in the race groove in one of said rings and bringing said assembly of ring and balls into the assembled position with the other race ring from one side and stopping the movement of assembling so that said balls shall not strike and deface the side of the race groove opposite the side from which they are assembled.

5. A method of assembling a ball bearing having an outer race ring and an inner race ring and balls therebetween in race grooves, which consists in holding said balls in one of said race grooves, bringing said assembly of ring and balls into the assembled position with the other ring from one side, and letting the ball or balls first entering the race groove of said other ring act as a pivot on which the assembling movement swings.

6. A method of assembling a ball bearing having an outer race ring and an inner race ring and balls therebetween in race grooves, which consists in holding said balls in the race grooves of said inner ring and inserting the assembly of balls and said inner ring into the race groove of the outer ring, and uniting said rings and balls by pressure from one side.

7. The method of assembling ball bearings having outer and inner race rings and balls therebetween, which consists in holding the rings and balls, providing a protective element between the balls and one of the rings, and uniting the rings and balls by pressure.

8. The method of assembling ball bearings having outer and inner race rings and balls therebetween in suitable race grooves, which consists in holding the rings and balls, providing a soft metal band between one of the rings and the balls, and uniting the rings and balls by pressure without drawing said band into the race groove.

9. A method of assembling ball bearings having an outer race ring and an inner race ring and balls therebetween in race grooves, which consists in holding one of the race rings and the balls in the race groove thereof, supporting the other race ring, supporting a soft metal band on said other race ring, and pressing said balls into the race groove of said other race ring protected by said band.

10. The method of assembling a ball bearing having outer and inner race rings and balls therebetween which consists in holding said balls in the race groove of one of said rings, providing a supporting plate for the other ring, heating said other ring, providing a protective element between said heated ring and said balls, and uniting the rings and balls by pressure.

11. The method of assembling a ball bearing having outer and inner race rings and balls therebetween which consists in holding the balls in the race groove of one of said race rings, providing a protective element between the other race ring and the balls, providing means of support for said protective element to prevent its being drawn between said balls and race ring into the race groove, and uniting the rings and balls by pressure.

12. The method of assembling a ball bearing having outer and inner race rings and balls therebetween which consists in holding the balls in the race groove of one of said race rings, pressing the two race rings into the assembled position on the balls, and providing a protective element between the balls and the ring while passing into said assembled position.

13. The method of assembling a ball bearing having outer and inner rings with oppositely placed uninterrupted race grooves and balls in said race grooves, which consists in holding the balls in the race groove of the inner race ring, pressing said balls into the unbroken race groove of the outer ring, and providing a protective element between said balls and outer race ring while said balls are passing into said unbroken groove.

In testimony whereof I have signed my name to this specification in the presence of two subscribing witnesses.

FREDERICK W. GURNEY.

Witnesses:
A. W. KETTLE,
H. U. HARRIS.

Copies of this patent may be obtained for five cents each, by addressing the "Commissioner of Patents, Washington, D. C."